United States Patent
Chang et al.

(10) Patent No.: US 6,914,389 B2
(45) Date of Patent: Jul. 5, 2005

(54) DIRECT-TYPE BACK LIGHT MODULE WITH PHOTO SENSORS

(75) Inventors: Chien-Jen Chang, Hsin-Chu Hsien (TW); Chao-Pao Chuang, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 140 days.

(21) Appl. No.: 10/604,894

(22) Filed: Aug. 25, 2003

(65) Prior Publication Data

US 2004/0246722 A1 Dec. 9, 2004

(30) Foreign Application Priority Data

May 23, 2003 (TW) .......................... 92114011 A

(51) Int. Cl.[7] ................................................ G09G 3/10
(52) U.S. Cl. .................... 315/169.3; 315/291; 315/224; 345/102; 345/81; 345/207; 345/84
(58) Field of Search ........................ 315/169.3, 169.2, 315/291, 224, 307, 362, 149, 312; 345/74.1, 81, 82, 84, 87, 98, 102, 204, 207; 362/27, 276, 555, 802

(56) References Cited

U.S. PATENT DOCUMENTS 6,636,190 B2 * 10/2003 Hirakata et al. ............ 345/74.1
2004/0125071 A1 * 7/2004 Kim et al. ................... 345/102
2004/0232853 A1 * 11/2004 Hur et al. .................... 315/291

* cited by examiner

*Primary Examiner*—Haissa Philogene
(74) *Attorney, Agent, or Firm*—Winston Hsu

(57) ABSTRACT

A direct-type backlight module with photo sensors has a plurality of lamps, a plurality of the photo sensors for detecting illumination of corresponding lamps, a comparative and arithmetic unit for processing signals generated by the photo sensors, and a main lamp driving loop for receiving feedback signals generated by the comparative and arithmetic unit and adjusting a lamp current voltage outputted by a minor lamp driving loop of each lamp, so as to achieve an uniform illumination of each lamp.

13 Claims, 9 Drawing Sheets

DIRECT-TYPE BACK LIGHT MODULE WITH PHOTO SENSORS

BACKGROUND OF INVENTION

1. Field of the Invention

The present invention relates to a direct-type back light module, and more specifically, to a direct-type back light module with photo sensors for improving the illumination uniformity of the direct-type back light module.

2. Description of the Prior Art

Back light modules are known in the art. The back light module, which is a key element in the fabrication of liquid crystal displays (LCDs), is widely used in monitors, notebooks, digital cameras, projectors and so on. Back light modules are typically divided into two major categories: edge light type and direct-type, wherein the direct-type back light module can provide higher intensity of light by utilizing a plurality of lamps and is thus more suited for large size display panels, such as display panels or TV panels, than the edge light type.

Please refer to FIG. 1 and FIG. 2, which respectively represent a cross-sectional view and an exploded side view of a direct-type back light module 10 according to the prior art. As shown in FIG. 1 and FIG. 2, the direct-type back light module 10 is disposed in a housing 14 under a display panel 12 and comprises a diffuser 16, a metal reflecting sheet 18 installed on side surfaces and a bottom surface of the direct-type back light module 10, and a plurality of parallel lamps disposed in a chamber 22 defined by the diffuser 16 and the metal reflecting sheet 18. Generally, the display panel is a LCD panel, and the housing 14 comprises a plastic shield, aluminum bezel or a metal sheet.

The metal reflecting sheet 18 is employed to upwardly reflect the light generated by the lamps 20, and the diffuser 16 is utilized to evenly scatter the reflected light by the metal reflecting sheet 18, so as to enhance the display efficiency of the direct-type back light module 10. In addition, the direct-type back light module 10 further comprises a diffuser 24 and at least one prism 26. The diffuser 24 is a hazy sheet composed of either polyethylene terephthalate (PET) or polycarbonate (PC), and has a thickness ranging from 0.11 to 0.15 cm, and the prism 26 is employed to reduce the difference of the luminous intensities on the display panel 12 in advance. The quantity and placing order of the diffuser 24 and prism 26 employed are defined by the specification of the direct-type back light module 10.

As previously mentioned, the light generated by the lamps 20 is upwardly reflected by the reflecting sheet 18 and is then scattered by the diffuser 16. By utilizing the diffuser 24 and the prism 26, the scattered light is further scattered to achieve a uniform luminous intensities on the display panel 12. However, the lamps 20 may be produced in different batches and therefore differ from each other in luminous intensities, despite of the fact that the lamp current and the voltage applied on each lamp 20 is the same. As a result, the display quality of the display panel 12 is reduced.

Normally, diffusers with either better diffusing abilities or greater thicknesses are frequently employed to solve this uneven luminous intensity issue on the display panel. Unfortunately, this would lead to a reduced intensity of the scattered light on the display panel that fails the product requirement. As a result, the lamp current applied on each lamp needs to be increased, shortening the product lives of the lamps due to the correspondingly increased power of the lamps during operation.

SUMMARY OF INVENTION

It is therefore a primary object of the present invention to provide a direct-type back light module with photo sensors so as to prevent an uneven luminous intensity of the light scattered on a display panel.

According to the claimed invention, the direct-type back light module comprises a housing with a transparent top surface, a first lamp and a second lamp paralleled installed in the housing, a first lamp driving loop and a second lamp driving loop for respectively driving the first and second lamps to emit light, a first photo sensor and a second photo sensor installed in the housing respectively for detecting the illuminations of the first and second lamps and a comparative and arithmetic unit. The first and second photo sensors are employed to respectively detect the illuminations of the first and second lamps, respectively generate a first signal and a second signal and respectively transmit the first and second signals to the comparative and arithmetic unit as the first and second lamp driving loops respectively supply a first lamp current and a second lamp current to respectively drive the first and second lamps to emit light, and the comparative and arithmetic unit is employed to generate and transmit a first feedback signal and a second feedback signal respectively to the first and second lamp driving loops for adjusting the first and second lamp currents, respectively, to achieve an uniform illumination of both the first and second lamps.

It is an advantage of the present invention against the prior art that the direct-type back light module comprises the plurality of the photo sensors for detecting the actual illumination of each lamp and the comparative and arithmetic unit for generating and transmitting feedback signals to each minor lamp driving loop after calculation. By adjusting the lamp currents applied to or the voltage applied on the lamps according to the feedback signals, an the uniform illumination of the lamps can be achieved. As a result, the display quality of the direct-type back light module is significantly improve to make the direct-type back light module a more acceptable product for the users.

These and other objectives of the present invention will no doubt become obvious to those of ordinary skill in the art after reading the following detailed description of the preferred embodiment, which is illustrated in the multiple figures and drawings.

DETAILED DESCRIPTION

Figure 1:
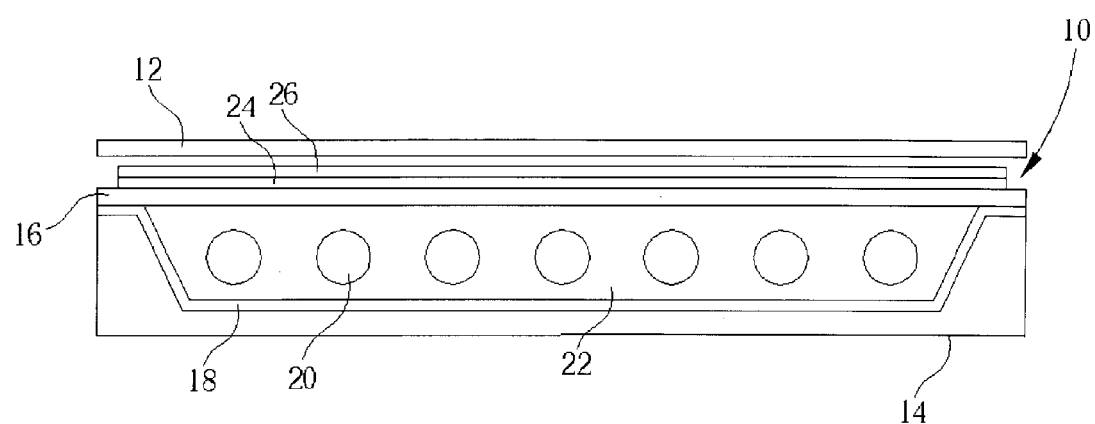
FIG. 1 is a cross-sectional view a direct-type back light module according to the prior art.
Figure 2:
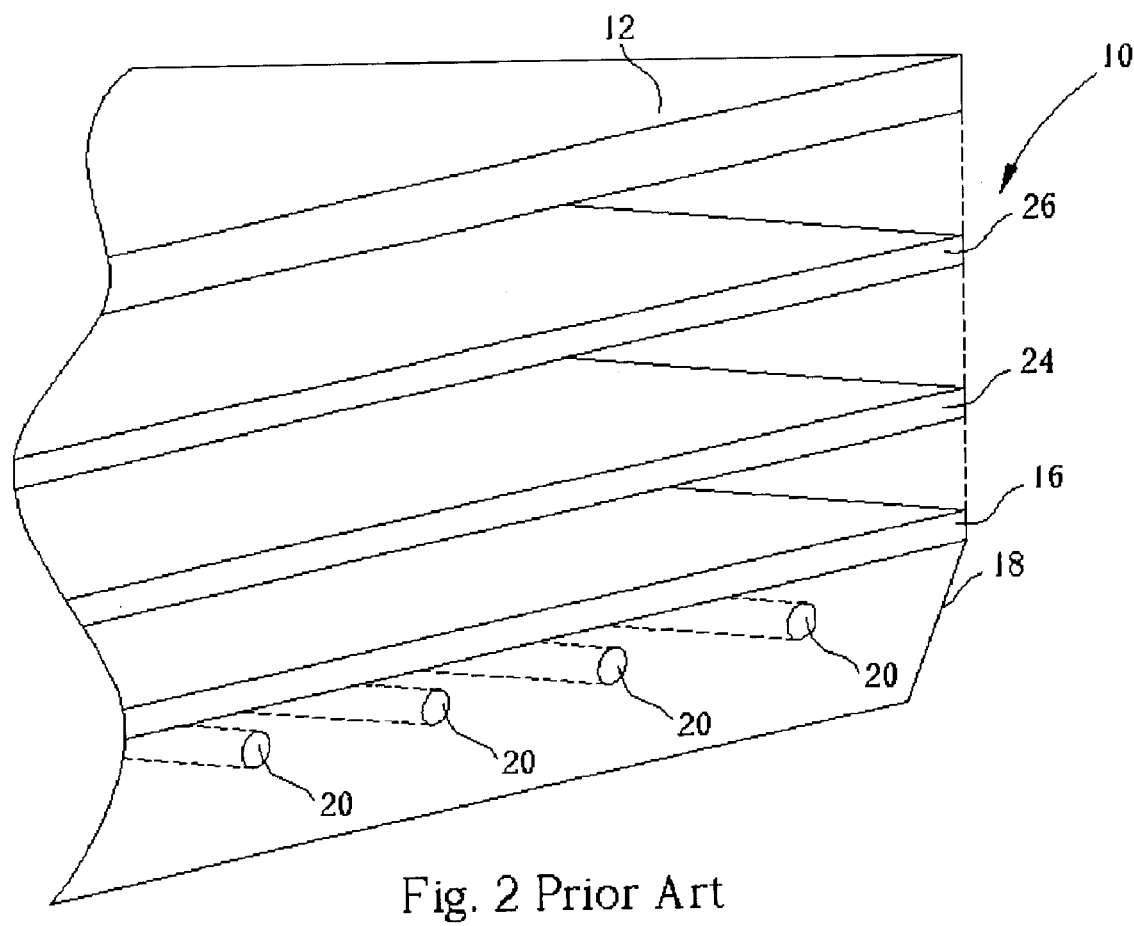
FIG. 2 is an exploded side view of the direct-type back light module 10 in FIG. 1.
Figure 3:
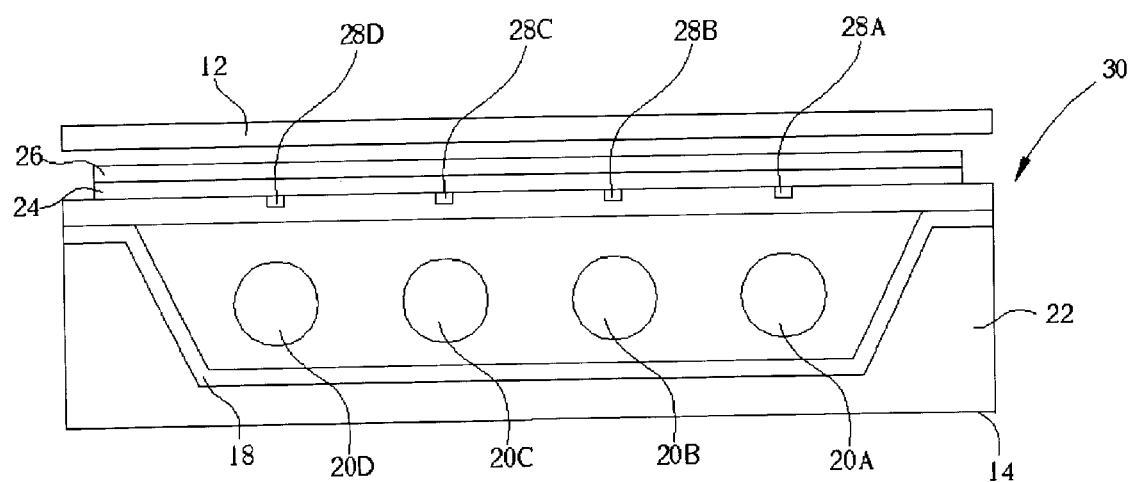
FIG. 3 is the cross-sectional view a direct-type back light module according to the present invention.
Figure 4:
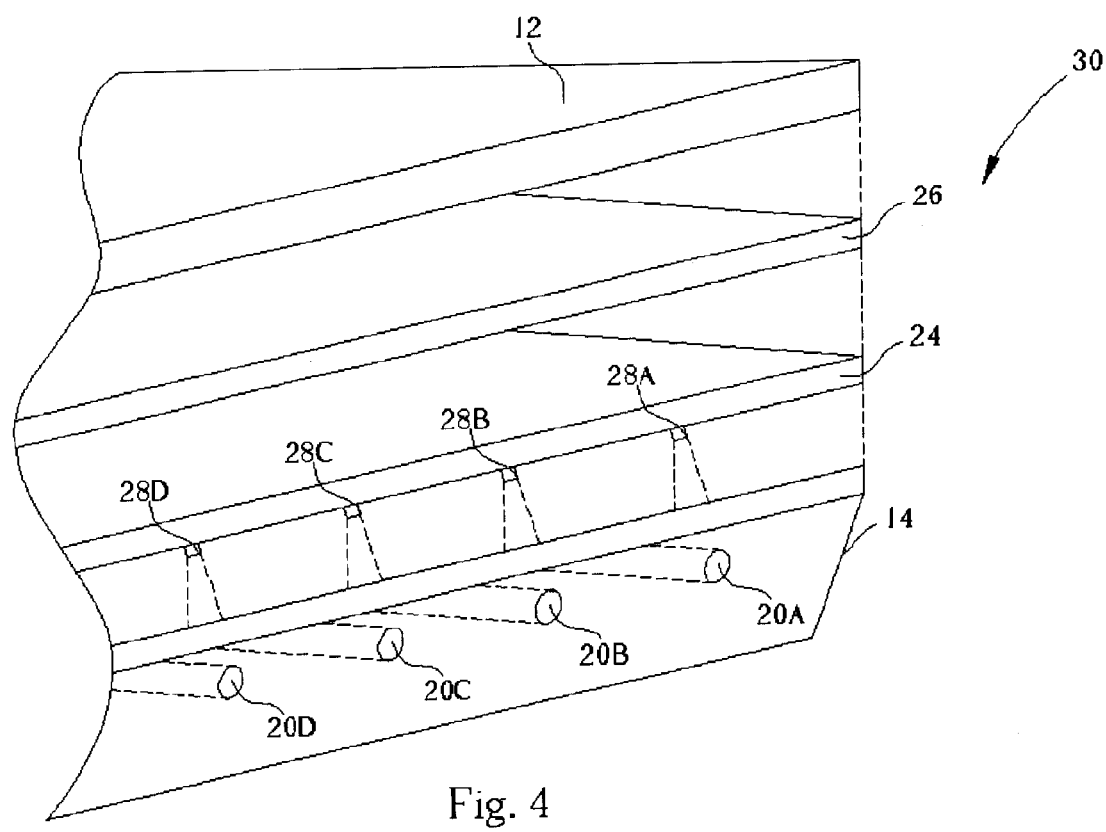
FIG. 4 is the exploded side view of the direct-type back light module 30 in FIG. 3.

Please refer to FIG. 3 and FIG. 4, which respectively represent a cross-sectional view and an exploded side view of a direct-type back light module 30 according to the present invention. For simplicity of description, the direct-type back light module 30 in the preferred embodiment of the present invention is a direct-type back light module comprising four lamps 20A, 20B, 20C and 20D. Alternatively, in another embodiment of the present invention, the direct-type back light module 30 is capable of comprising a plurality of lamps in addition to four lamps.

As shown in FIG. 3 and FIG. 4, the direct-type back light module 30 is disposed in a housing 14 under a display panel 12 and comprises a reflecting sheet 18, the plurality of parallel lamps 20A, 20B, 20C and 20D, a diffuser 24 and an optical film 26. The reflecting sheet 18 comprises a flat bottom surface and a sloping side surface and is composed of either aluminum, alloy, foamed polyethylene terephthalate (foamed PET) or polycarbonate (PC). The lamps 20A, 20B, 20C and 20D comprise either cold cathode fluorescent lamps (CCFLs) or other light emitting bodies and are parallel arranged in a chamber 22 defined by the reflecting sheet 18. The diffuser 24 comprises material with high thermal conductivity, such as aluminum (Al), magnesium (Mg), copper (Cu), titanium (Ti), silver (Ag) or polymers. The reflecting sheet 18, the lamps 20, the diffuser 24 and the optical film 26 are all fixed a housing 14 for the purpose of preventing dusts from entering the direct-type back light module 30.

Figure 5:
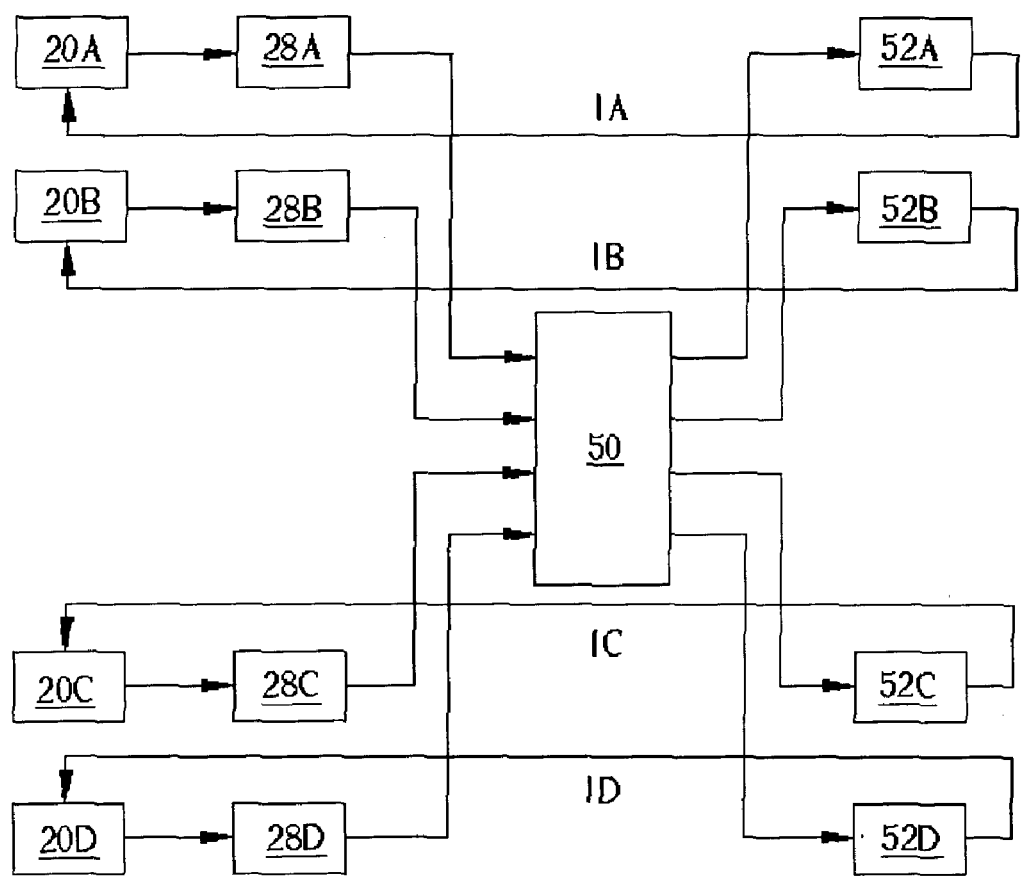
FIG. 5 is a functional block diagram of the back light module 30 in FIG. 3 and FIG. 4.
Figure 6:
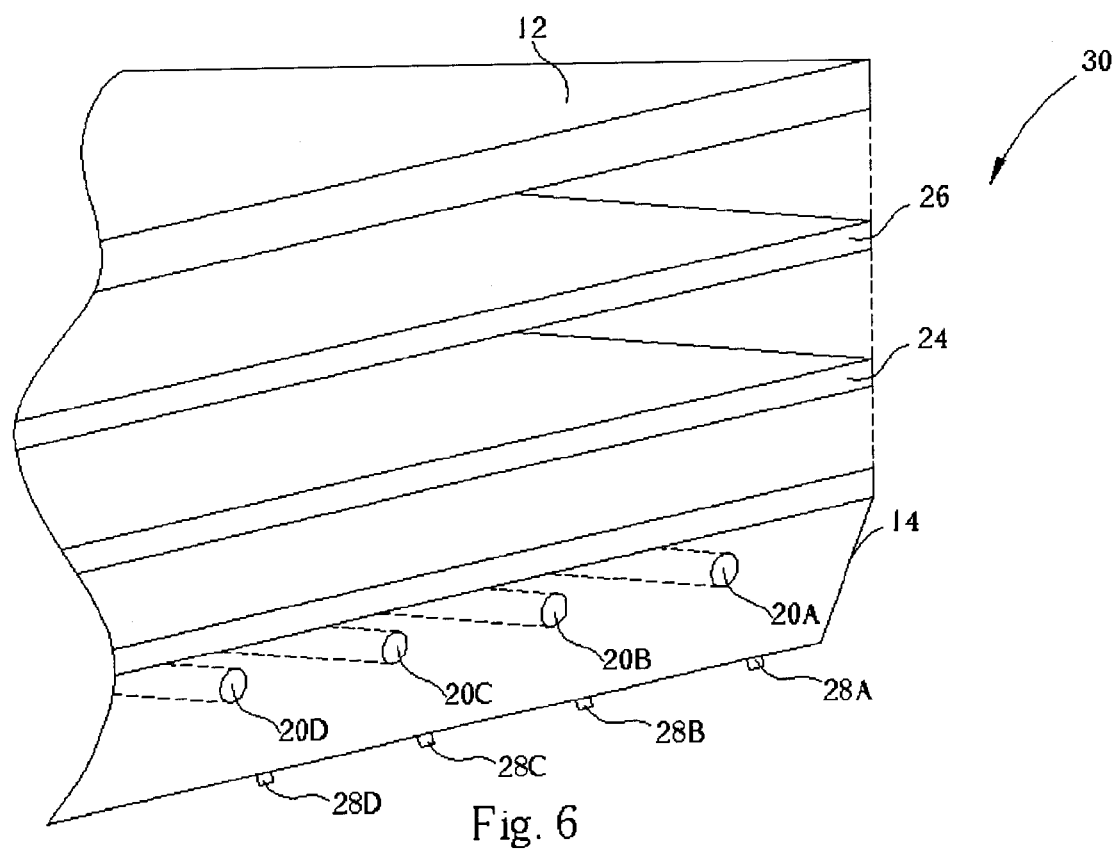
FIG. 6 to FIG. 9 are schematic views of a direct-type back light module according to another embodiment of the present invention.
Figure 7:
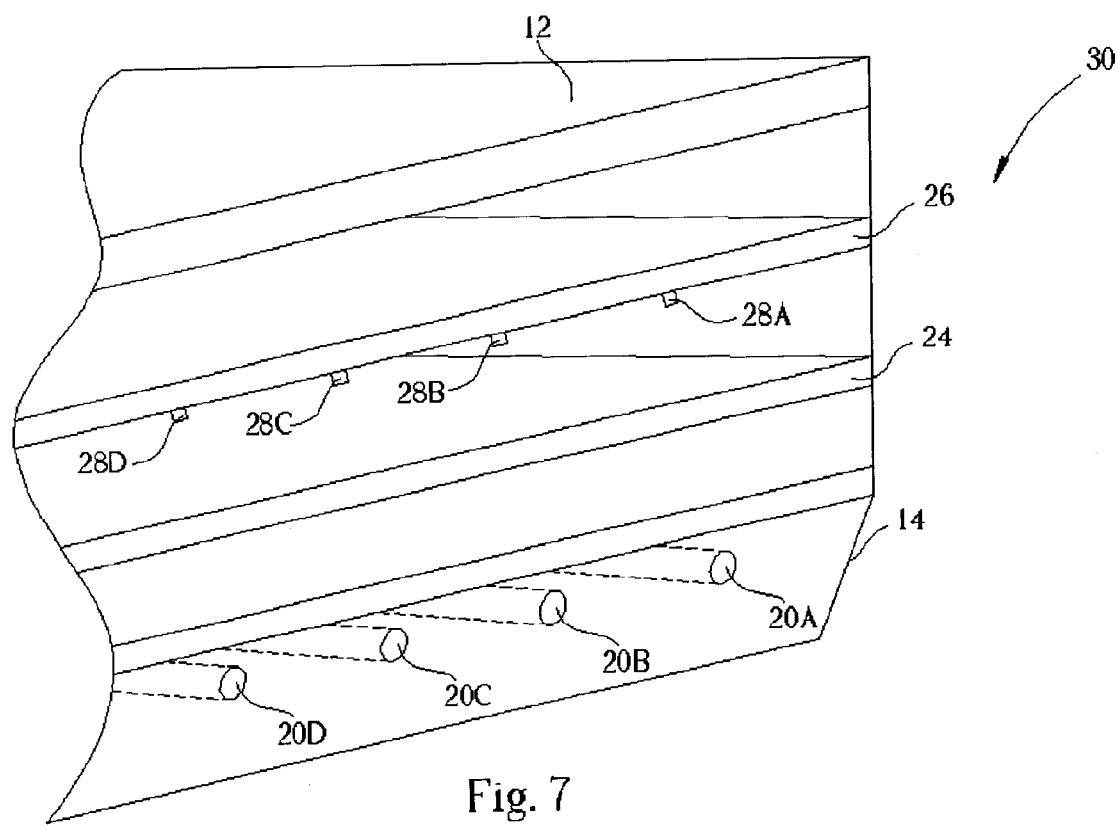
Figure 8:
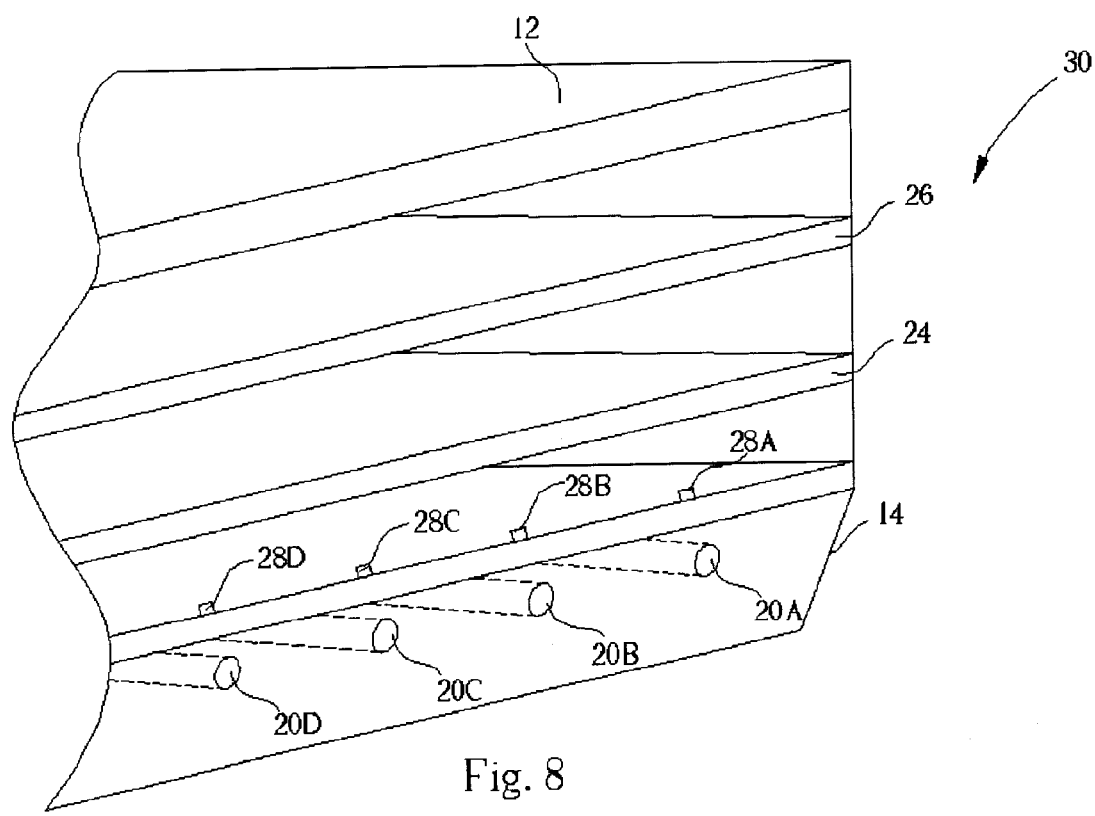

Please refer to FIG. 5 of a functional block diagram of the direct-type back light module 30 in FIG. 3 and FIG. 4. As shown in FIG. 4 and FIG. 5, the direct-type back light module 30 further comprises a photo detecting device (not shown in FIG. 4 and FIG. 5) installed in the housing 14, a comparative and arithmetic unit 50 and a main lamp driving loop (not shown in FIG. 4 and FIG. 5). The photo detecting device comprises a plurality of photo sensors 28A, 28B, 28C and 28D for respectively detecting the illuminations of the corresponding lamps 20A, 20B, 20C and 20D, and further comprises a plurality of minor lamp driving loops 52A, 52B, 52C and 52D for respectively driving the corresponding lamps 20A, 20B, 20C and 20D to emit light. Each of the photo sensors 28A, 28B, 28C and 28D comprises a photo diode, a charge couple device (CCD), a photo transistor or a photosensitive resistor, and the comparative and arithmetic unit 50 is employed to generate a feedback signal for adjusting the lamp currents generated by the minor lamp driving loops 52A, 52B, 52C and 52D according to electrical signals transmitted from the photo sensors 28A, 28B, 28C and 28D.

As the minor lamp driving loops 52A, 52B, 52C and 52D supply lamp currents $I_A$, $I_B$, $I_C$ and $I_D$ to, or apply voltages $V_A$, $V_B$, $V_C$ and $V_D$ on, the lamps 20A, 20B, 20C and 20D, respectively, to make the lamps 20A, 20B, 20C and 20D to emit light, the photo sensors 28A, 28B, 28C, 28D respectively detect the illuminations of the lamps 20A, 20B, 20C and 20D, and respectively generate a corresponding signal. Each of the corresponding signals is then transmitted to the comparative and arithmetic unit 50 for calculation, and a feedback signal is transmitted to the minor lamp driving loops are 52A, 52B, 52C and 52D after the calculation to adjust either the lamp currents $I_A$, $I_B$, $I_C$ and $I_D$ or the voltages $V_A$, $V_B$, $V_C$ and $V_D$, so as to achieve an uniform illumination of the lamps 20A, 20B, 20C and 20D, improving the display quality of the direct-type back light module 30.

Please refer to FIG. 6 to FIG. 9 of schematic views of a direct-type back light module according to another embodiment of the present invention. As shown in FIG. 6 to FIG. 9, the photo sensors 28A, 28B, 28C and 28D is not only restricted to be disposed under the diffuser 24 as shown in FIG. 4 and FIG. 5, but can also be alternatively disposed either under the lamps 20A, 20B, 20C and 20D, above or under the optical film 26, or in any positions capable of detecting the illuminations of lamps 20A, 20B, 20C and 20D. In addition, since the quantity and placing order of the diffuser 24 and optical film 26 employed are defined by the specification of the direct-type back light module 30, the distribution of the photo sensors 28A, 28B, 28C and 28D can be correspondingly arranged as well.

Figure 9:
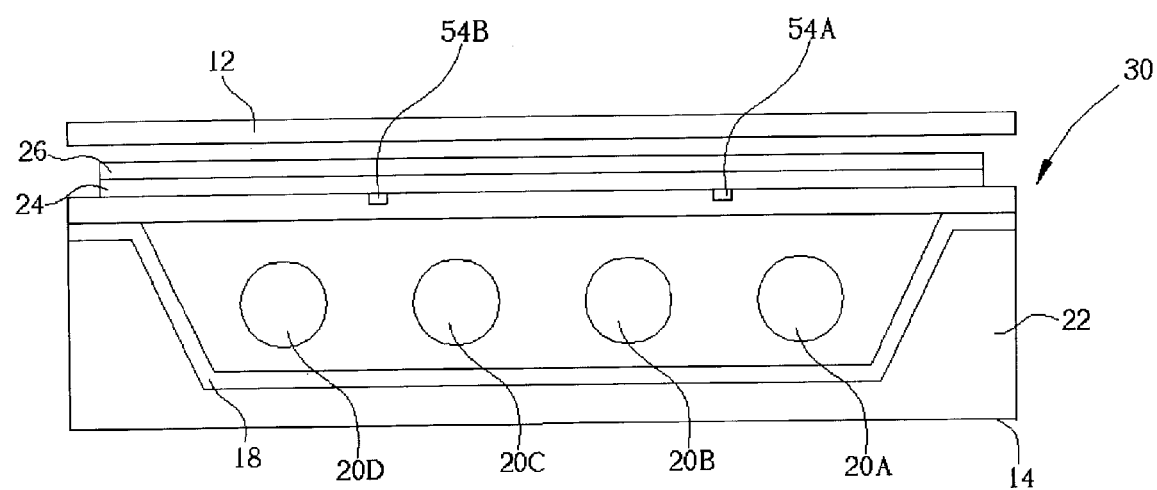

In still another embodiment of the present invention, the direct-type back light module can be divided into a plurality of regions with at least one lamp in each region. The photo sensors are disposed at the center of each region for detecting the actual average illumination in each region. Similar to the preferred embodiment of the present invention revealed in FIG. 3 to FIG. 5, a comparative and arithmetic unit is then utilized to adjust either the lamp current or the voltage in each region, so as to achieve an uniform illumination of the plurality of regions, improving the display quality of the direct-type back light module. As shown in FIG. 9, in still another embodiment of the present invention, the photo detecting device in the direct-type back light module 30 either with more lamps 20 or not critically required in luminous uniformity of the display can be designed with only a photo sensors 54A disposed at a corresponding location to the lamps 20A and 20B for detecting the average illumination of the lamps 20A and 20B and a photo sensor 54B disposed at a corresponding location to the lamps 20C and 20D for detecting the average illumination of the lamps 20C and 20D.

As a conclusion, the direct-type back light module revealed in the present invention utilizes the photo detecting device installed in the housing to detect illuminations of the lamps, and then uses the comparative and arithmetic unit to generate and transmit the feedback signals to each minor lamp driving loop after calculation to adjust either the lamp current supplied to or the voltage applied on each lamp, such as increasing the lamp current and voltage for the lamp with low illumination or decreasing the lamp current and voltage for the lamp with high illumination, so as to compensate the illumination of each lamp and achieve an uniform illumination of the plurality of the lamps. As a result, the display quality of the direct-type back light module is significantly improved to make the direct-type back light module a more acceptable product for the users.

In comparison with the direct-type back light module in the prior art, the direct-type back light module revealed in the present invention comprises the photo detecting device for detecting illumination of each lamp or in each region and the comparative and arithmetic unit for generating and transmitting the feedback signals to the main lamp driving loop after calculation. Therefore, the lamp currents supplied to the lamps can be adjusted according to the feedback signal so as to achieve an uniform illumination of the lamps. Consequently, the display quality of the direct-type back light module is significantly improved.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A direct-type back light module with photo sensors comprising:

a housing with a transparent top surface;

a first lamp installed in the housing;

a second lamp arranged in parallel with the first lamp and installed in the housing;

a first lamp driving loop for driving the first lamp to emit light;

a second lamp driving loop for driving the second lamp to emit light;

a first photo sensor installed in the housing for detecting the illumination of the first lamp;

a second photo sensor installed in the housing for detecting the illumination of the second lamp; and a comparative and arithmetic unit;

wherein the first and second photo sensors are employed to respectively detect the illuminations of the first and second lamps, respectively generate a first signal and a second signal and respectively transmit the first and second signals to the comparative and arithmetic unit as the first and second lamp driving loops respectively supply a first lamp current and a second lamp current to respectively drive the first and second lamps to emit light, and the comparative and arithmetic unit is employed to generate and transmit a first feedback signal and a second feedback signal respectively to the first and second lamp driving loops for adjusting the first and second lamp currents, respectively, to achieve an uniform illumination of both the first and second lamps.

2. The direct-type back light module of claim 1 wherein either the first or the second photo sensor comprises either a photo diode, a charge couple device (CCD), a photo transistor or a photosensitive resistor.

3. The direct-type back light module of claim 1 wherein the first and second photo sensors are respectively installed in a first position and a second position capable of detecting an illumination difference between the first and the second lamps.

4. The direct-type back light module of claim 1 wherein the first and second lamps are both either light emitting diodes (LEDs) or cold cathode fluorescent lamps (CCFLs).

5. A direct-type back light module with photo sensors comprising:

a housing comprising a first region and a second region, each of the first and second regions comprising at least a lamp;

a main lamp driving loop for driving the lamps in the first and second regions to emit light;

a photo detecting device installed in the housing for detecting the illumination of the lamps in the first and second regions; and a comparative and arithmetic unit;

wherein the photo detecting device is employed to detect the illuminations of the lamps in the first and second regions, generate a first signal and a second signal and transmit the first and second signals to the comparative and arithmetic unit as the main lamp driving loop drives the lamps in the first and second regions to emit light, and the comparative and arithmetic unit is employed to generate and transmit a first feedback signal and a second feedback signal respectively to the main lamp driving loop for adjusting the main lamp driving loop to achieve an uniform illumination of lamps in both the first and secondregion.

6. The direct-type back light module of claim 5 wherein the photo detecting device comprises a plurality of photo sensors.

7. The direct-type back light module of claim 6 wherein the photo sensor comprises either a photo diode, a CCD, a photo transistor or a photosensitive resistor.

8. The direct-type back light module of claim 6 wherein each of the photo sensors is corresponding to one of the lamps in either the first or the second regions.

9. The direct-type back light module of claim 6 wherein the photo detecting device comprises a pair of photo sensors.

10. The direct-type back light module of claim 9 wherein the pair of photo sensors are respectively corresponding to the first and second regions.

11. The direct-type back light module of claim 10 wherein the pair of photo sensors are respectively installed in a first position in the first region and a second position in the second region capable of detecting an illumination difference between lamps in the first and the second regions.

12. The direct-type back light module of claim 5 wherein the main lamp driving loop comprises a first minor lamp driving loop and a second minor lamp driving loop for respectively driving the lamps in the first and second regions to emit light.

13. The direct-type back light module of claim 12 wherein the photo detecting device is employed to detect the illuminations of the lamps in the first and second regions, generate a first signal and a second signal respectively corresponding to the illuminations of the lamps in the first and second regions and transmit the first and second signals to the comparative and arithmetic unit as the first and second minor lamp driving loops respectively supply a first lamp current and a second lamp current to respectively drive the lamps in the first and second regions to emit light, and the comparative and arithmetic unit is employed to generate and transmit a third signal and a fourth signal respectively to the first and second minor lamp driving loops for adjusting the first and second lamp currents, respectively, to achieve an uniform illumination of the lamps in both the first and secondregions.

* * * * *